United States Patent
Oh et al.

(10) Patent No.: US 7,507,122 B2
(45) Date of Patent: Mar. 24, 2009

(54) SLEEVE CONNECTOR FOR ELECTROMAGNETIC CLUTCH

(75) Inventors: Sung Taeg Oh, Daejeon (KR); Suk Jae Chung, Daejeon (KR); Hun-Sang Lee, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 0 days.

(21) Appl. No.: 11/934,110

(22) Filed: Nov. 2, 2007

(65) Prior Publication Data

US 2008/0105511 A1    May 8, 2008

(30) Foreign Application Priority Data

Nov. 3, 2006 (KR) ........................ 10-2006-0108574

(51) Int. Cl.
*H01R 13/66* (2006.01)
(52) U.S. Cl. ................................. 439/620.21
(58) Field of Classification Search ............ 439/620.08, 439/620.21, 620.27, 620.31; 310/71, 68 C; 335/107
See application file for complete search history.

(56) References Cited

U.S. PATENT DOCUMENTS

| | | | | |
|---|---|---|---|---|
| 3,864,002 A | * | 2/1975 | Naser et al. | 439/76.1 |
| 4,772,225 A | * | 9/1988 | Ulery | 439/620.09 |
| 5,508,671 A | * | 4/1996 | Takashi | 335/296 |
| 7,138,895 B2 | * | 11/2006 | Chung | 335/299 |
| 7,224,253 B2 | * | 5/2007 | Chung | 335/299 |
| 2007/0017770 A1 | * | 1/2007 | Oh et al. | 192/84.961 |

FOREIGN PATENT DOCUMENTS

JP    07127662    5/1995
WO    2004067982   8/2004

* cited by examiner

*Primary Examiner*—Phuong K Dinh
(74) *Attorney, Agent, or Firm*—Lowe Hauptman Ham & Berner LLP

(57) ABSTRACT

A sleeve connector for an electromagnetic clutch has a first holder carrying a diode and a resistor for absorbing surge voltage and removing an induced magnetic field generated by an electromagnetic clutch field coil assembly. First and second terminals respectively connected with the diode and the resistor are held by a second holder so the terminals are insulated from each other. A molded plastic middle assembly encapsulates the diode, resistor, both holders and both terminals and joins the holders to each other.

8 Claims, 5 Drawing Sheets

- Prior Art -

— Prior Art —

— Prior Art —

SLEEVE CONNECTOR FOR ELECTROMAGNETIC CLUTCH

RELATED APPLICATIONS

The present application is based on, and claims priority from, KR Application Number 10-2006-0108574, filed Nov. 3, 2006, the disclosure of which is hereby incorporated by reference herein in its entirety.

BACKGROUND OF THE INVENTION

1. Field of the Invention

The present invention relates to a sleeve connector for an electromagnetic clutch coupled with a vehicle compressor, and more particularly, to a sleeve connector which is an electric power connection part of an electromagnetic clutch field coil assembly in an air conditioner for a vehicle, wherein one end of the sleeve connector for the electromagnetic clutch is connected to a connection port formed at the electromagnetic clutch field coil assembly and a power terminal is inserted into the other end.

2. Description of the Related Art

In general, a vehicle compressor for an air conditioner is operated by means of a driving power of an engine, and an electromagnetic clutch are mounted together so as to intermittently operate the vehicle compressor only in a case where air conditioning is required.

FIG. 1 is a cross-sectional view of an electromagnetic clutch of a compressor.

An operation principle of the compressor 220 will be briefly described below with reference to FIG. 1. First, in a case where an engine is operating, a pulley 260 connected from a driving shaft of the engine (not shown) through a belt (not shown) rotates. Further, the pulley 260 is connected to a rotating shaft of the compressor 220 via the electromagnetic clutch. In general, a rotor 280 is coupled with the pulley 260, and an electromagnetic clutch field coil assembly 210 having a coil 211 and a coil housing 212 is disposed with the rotor 280 at a minute interval.

Furthermore, the rotor 280 is connected to the rotating shaft of the compressor 220 with a bearing 270 interposed therebetween.

If a driver turns on a switch for an air conditioner in this state, a disc 221 fixedly coupled with the rotating shaft of the compressor 220 and a disc 261 fixedly coupled with the pulley 260 are contacted with each other to rotate together by means of a frictional force while electric power is applied to the electromagnetic clutch field coil assembly 210, so that the compressor 220 is operated.

On the contrary, unless electric power is applied to the electromagnetic clutch field coil assembly 210 through electric power connection lines 230 and 240, since the disc 261 of the pulley 260 and the disc 221 of the compressor 220 are separated from each other, the power is cut off and the compressor 220 does not operate.

Electric power may be applied to the electromagnetic clutch field coil assembly 210 by manually controlling the switch of the air conditioner, and the application of the electric power to the electromagnetic clutch field coil assembly 210 may be automatically controlled depending on a room temperature of a vehicle by connecting it to an electronic control unit (ECU) that is not shown.

Meanwhile, in the operation process of the compressor, counter electromotive force that is reversely transferred from the electromagnetic clutch to the power supplying part may be generated. Since there is a property that a magnetic field induced along a current flow induces again an electric field according to a change in the magnetic field, in order to remove the induced magnetic field and the induced electromotive force because of characteristic of the electromagnetic clutch which has to secure a sensitivity to command following, a resistor and a diode are provided in the electromagnetic clutch field coil assembly. However, if the resistor and diode are provided in the electromagnetic clutch field coil assembly, it is apprehended that the parts are damaged by heat generated in the electromagnetic clutch field coil assembly. Thus, it is preferable that the resistor and diode are provided at an outside of the electromagnetic clutch field coil assembly.

FIG. 2 is an exploded perspective view of a conventional coupling relationship between a sleeve connector 200 for an electromagnetic clutch and an electromagnetic clutch field coil assembly 300. The sleeve connector 200 has terminals 150 and 160 for coupling with a power supplying line and the electromagnetic clutch field coil assembly 300. The terminals 150 and 160 are made of a conductive metal and a pair of terminals is provided in the sleeve connector 200. The pair of terminals 150 and 160 is plastic-molded to be insulated from each other and thus form a housing 180. After the terminals 150 and 160 are plastic-molded in a metal mold, the diode and resistor are installed in the housing 180 and then epoxy 170 is injected therein, thereby fabricating the sleeve connector 200. The electromagnetic clutch field coil assembly 300 is formed with a terminal insertion groove 250 in which the terminals are inserted.

In general, the diode and resistor are built into the sleeve connector or an electric power connection part of an electromagnetic clutch field coil assembly. Prior arts relevant to a built-in position or method of the diode and resistor are provided as follows.

In Japanese Patent Laid-Open Publication No. H07-127662 (published on May 16, 1995), there was disclosed a surge voltage absorbing device for absorbing a surge voltage generated when power supplied to a field coil assembly is cut off temporarily, in which a diode connected with a terminal is provided in a connector.

Further, in PCT WO 2004/067982 (published on Aug. 12, 2004) which was filed by the applicant, there was disclosed a construction in which a diode and a resistor are used for absorbing a serge voltage, and a sleeve connector is provided so as to connect between an electromagnetic clutch field coil assembly and an external power source, and the sleeve connector is coupled with a connection part formed at the electromagnetic clutch field coil assembly.

FIG. 3 is an illustration of a conventional electromagnetic clutch field coil assembly. As shown in FIG. 3, the conventional electromagnetic clutch field coil assembly is injection-molded in a status that two terminals 150 and 160 are put in a mold, and a diode 120 and a resistor 110 are properly disposed in a space, and then an upper side thereof is finished with epoxy.

However, due to the additional epoxy process, there is a problem that fabricating cost is increased and productivity thereof is reduced. And unlike in the sleeve connector for an electromagnetic clutch according to the present invention, since a holder is not used in the conventional electromagnetic clutch field coil assembly, the diode and resistor may be deviated from their original positions during the injection molding process. Further, in case that the injection molding process is performed in the state that the terminals are put in the mold, the terminals may be shorted to each other.

SUMMARY OF THE INVENTION

It is an object of the present invention to provide a new and improved sleeve connector for an electromagnetic clutch that can reduce the fabricating cost and also increase the productivity thereof.

It is another object of the present invention to provide a new and improved sleeve connector that can eliminate an epoxy molding process, thereby improving an economical efficiency and productivity thereof.

To achieve these objects of the present invention, there is provided a sleeve connector for an electromagnetic clutch, comprising a discharge device for absorbing a surge voltage; a magnetic field elimination device for eliminating residual magnetic field, which is electrically connected with one end of the discharge device; a first holder for installing the discharge device and the magnetic field elimination device; first and second terminals which are respectively connected with the discharge device and the magnetic field elimination device; and a second holder for installing the two terminals in a status that the two terminals are insulated from each other, wherein a middle assembly comprising the discharge device, the magnetic field elimination device, the first holder, the first and second terminals and the second holder is formed by plastic molding.

Preferably, a fixing protrusion is formed at one of the first and second holder, and a fixing hole corresponding to the fixing protrusion is formed at the other.

Preferably, the discharge device is a diode, and the magnetic field elimination device is a resistor.

Preferably, the first and second terminals respectively comprise a diode connection part and a resistor connection part so that a wire of the resistor is connected to one of the terminals and a wire of the diode is connected to the other.

DETAILED DESCRIPTION OF THE DRAWINGS

Hereinafter, preferred embodiments of the present invention will be described in detail with reference to the accompanying drawings.

Figure 1:
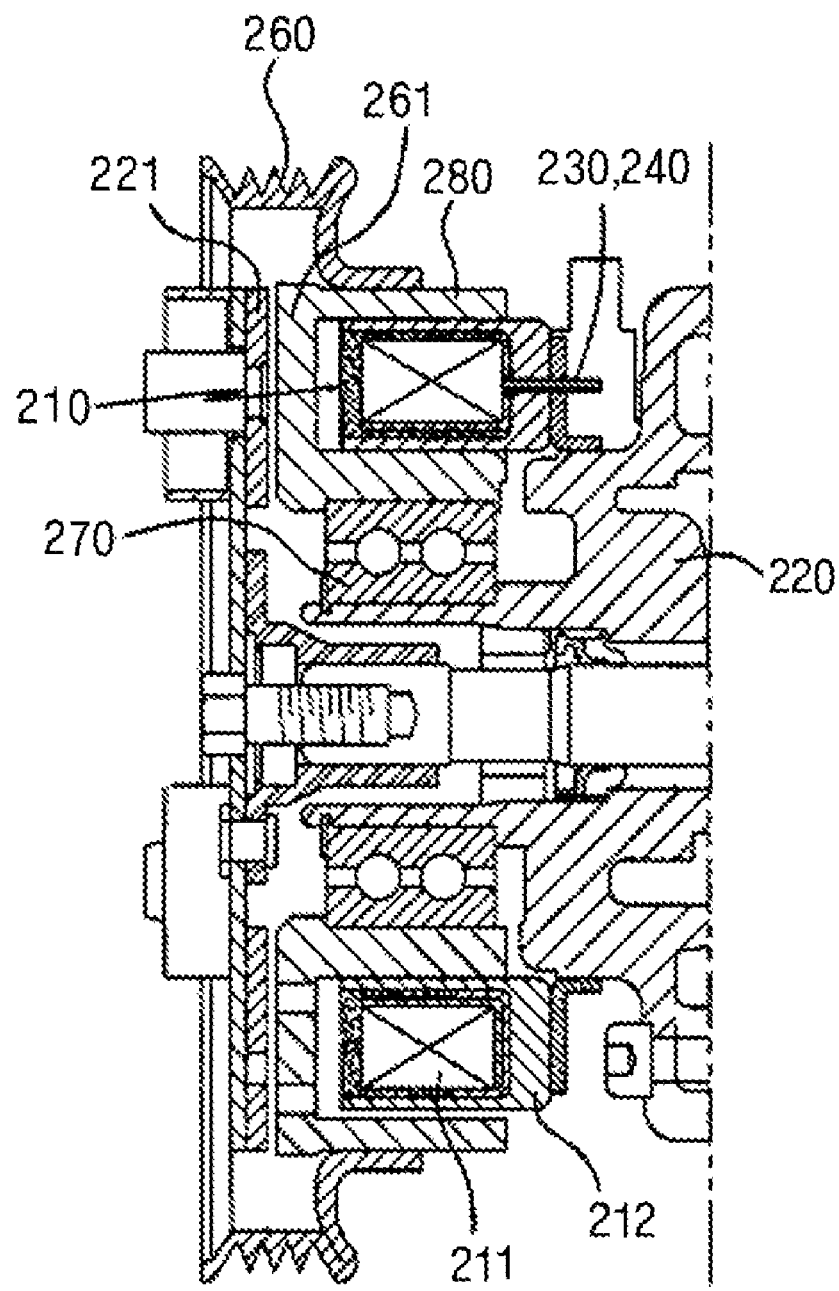
FIG. 1 is a sectional view of a conventional electromagnetic clutch.
Figure 2:
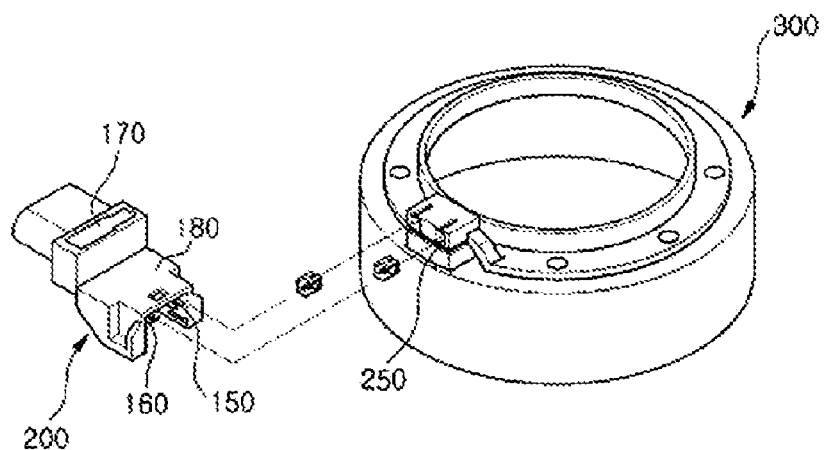
FIG. 2 is an exploded perspective view of a conventional coupling relationship between a sleeve connector for an electromagnetic clutch and an electromagnetic clutch field coil assembly.
Figure 3:
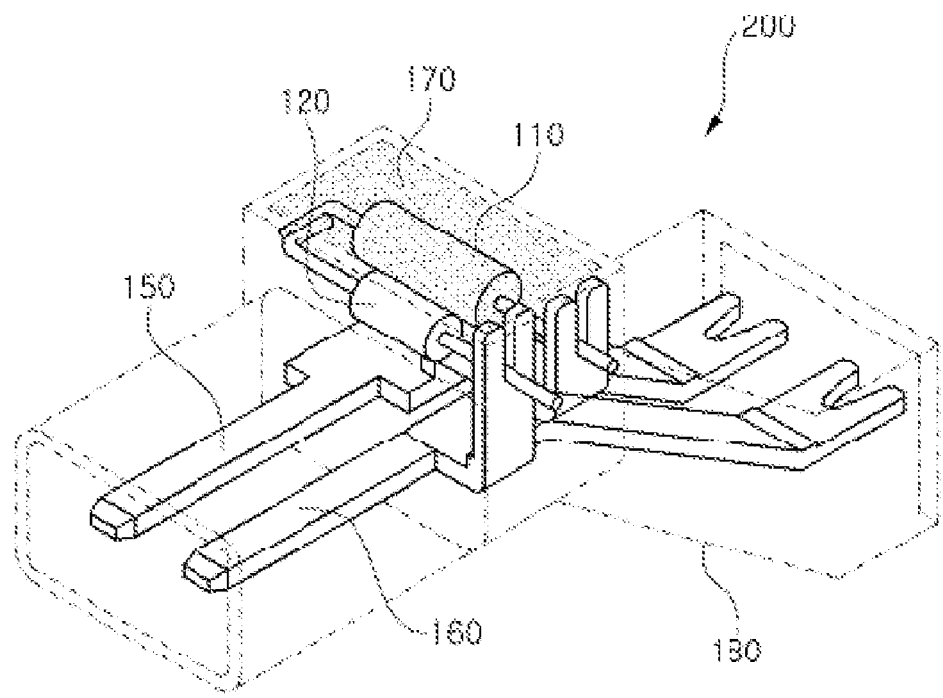
FIG. 3 is a perspective view of the conventional sleeve connector for the electromagnetic clutch.
Figure 4:
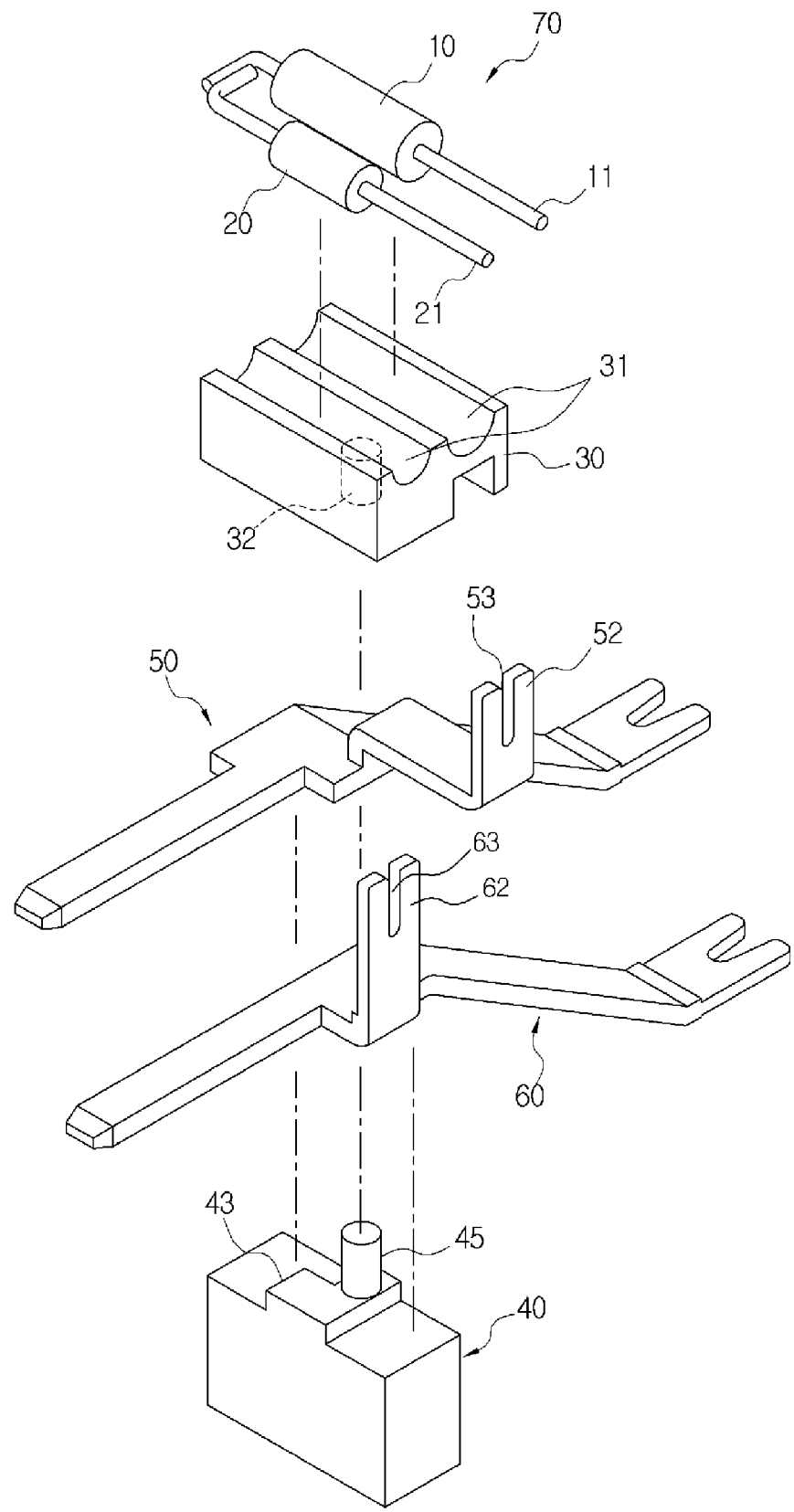
FIG. 4 is an exploded perspective view of a middle assembly of a sleeve connector for an electromagnetic clutch according to a preferred embodiment of the present invention.

FIG. 4 is an exploded perspective view of a middle assembly of a sleeve connector for an electromagnetic clutch according to a preferred embodiment of the present invention. In the preferred embodiment of the present invention, a diode 20 is used as a discharge device for absorbing a surge voltage and a resistor 10 is used as a magnetic field removing device.

The diode 20 and resistor 10 respectively have two wires that are respectively coupled with both ends of the diode 20 and resistor 10. The diode 20 and resistor 10 are electrically connected by welding one of the wires of each of them to each other The diode 20 and resistor 10 connected to each other through the wires are installed to a first holder 30. By the first holder 30 and installation grooves 31, it can be prevented that the diode 20 and resistor 10 are deviated from their positions during a plastic molding process. Besides the first holder 30 for fixing the diode 20 and resistor 10, there is provided a second holder 40 for fixing two terminals 50 and 60 in a status that they are insulated from each other, which is coupled with the first holder 30 to form a middle assembly 70. The second holder 40 functions to prevent a short circuit between a plus (+) electrode and a minus (−) electrode and also secure stability during the plastic holding process.

As shown in FIG. 4, the two terminals 50 and 60 are installed on an upper surface of the second holder 40. On the upper surface of the second holder 40, there is formed a raised protrusion portion 43 for preventing contact between the two terminals 50 and 60. The two terminals formed of a metallic material are respectively connected with the diode and the resistor so as to absorb the surge generated from a field coil and eliminate the magnetic field.

The terminals 50 and 60 are electrically connected with the wires 21 and 11 of the diode 20 and resistor 10, respectively. In other words, the first terminal 50 is connected with the wire 11 of the resistor 10 and the second terminal 60 is connected with the wire 21 of the diode 20.

Preferably, the terminals 50 and 60 respectively have a resistor connection part 52 which can be easily connected with the wire 11 of the resistor 10 and a diode connection part 62 which can be easily connected with the wire 21 of the diode 20. More preferably, the resistor connection part 52 and the diode connection part 62 respectively have grooves 53 and 63 in which each end of the wires 11 and 21 can be simply inserted, so that the resistor 10 and the diode 20 can be facilely connected with the terminals 50 and 60.

Figure 5A:
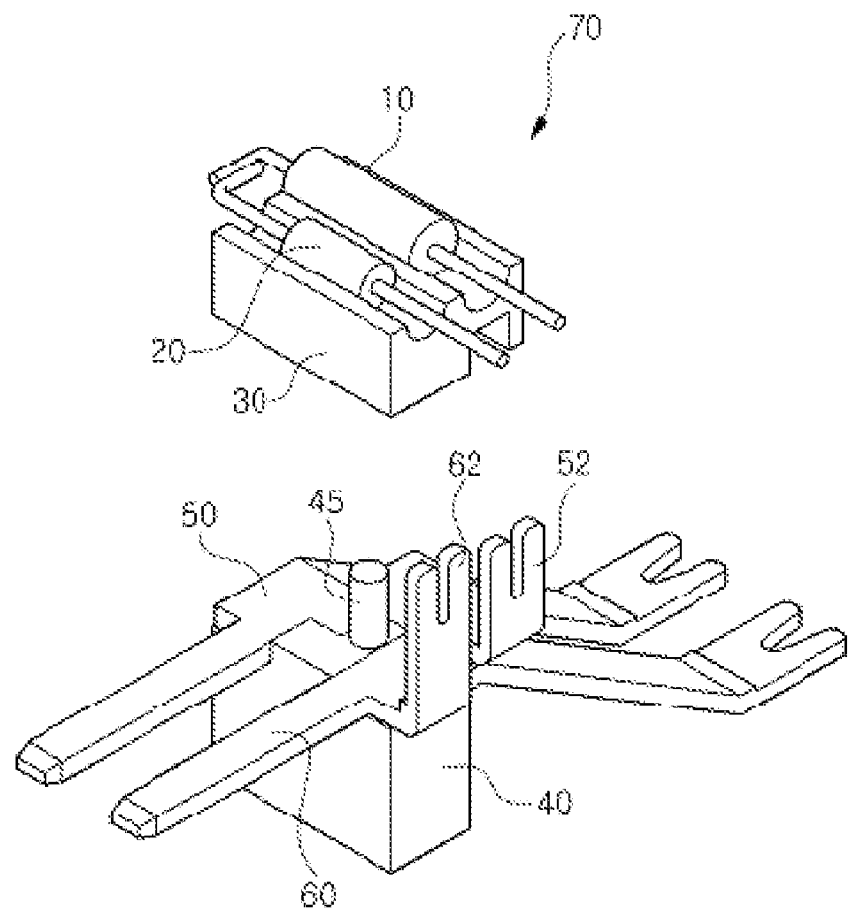
FIG. 5a is a partial exploded perspective view of a first holder in which a resistor and a diode are installed and a second holder in which both terminals are installed, before they are coupled with each other.
Figure 5B:
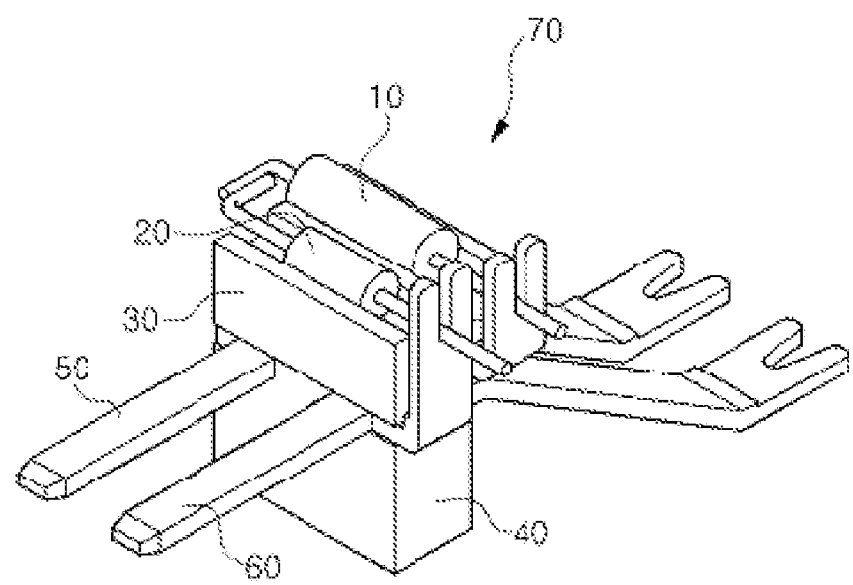
FIG. 5b is a perspective view of the middle assembly of the sleeve connector for the electromagnetic clutch according to a preferred embodiment of the present invention.
Figure 6:
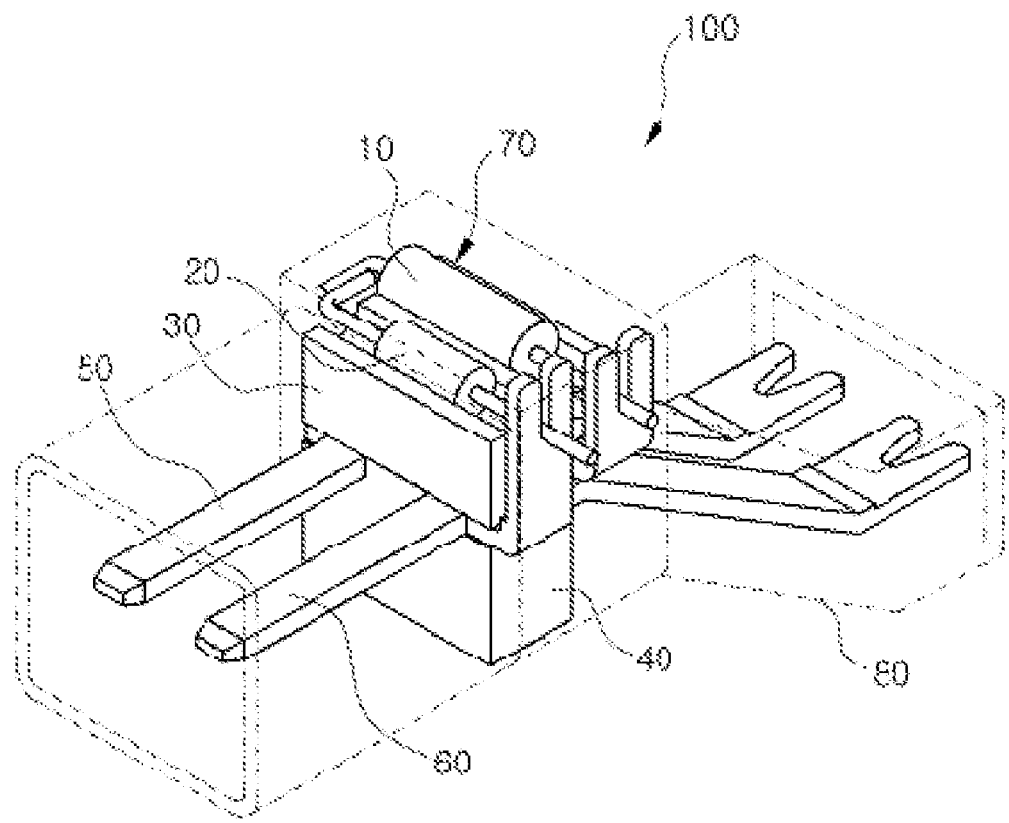
FIG. 6 is a perspective view of the sleeve connector for the electromagnetic clutch according to a preferred embodiment of the present invention.

In FIGS. 4 to 6, in order to facilely connect the first and second terminals 50 and 60 with the wires 11 and 21 of the resistor and the diode, the terminals 50 and 60 have the resistor connection part 52 and the diode connection part 62 which respectively have the grooves 53 and 63 in which the ends of the wires 11 and 21 can be inserted.

However, as shown in FIG. 4, if the both terminals 50 and 60 can be respectively connected with the resistor 10 and diode 20 installed on the first holder 30 in a status that the both terminals 50 and 60 are not contacted with each other, the diode connection part 62 and the resistor connection part 52 may have any shape.

FIG. 5 includes perspective views of the middle assembly of the sleeve connector for the electromagnetic clutch before and after the assembling process according to a preferred embodiment of the present invention.

FIG. 5a is a perspective view of the first holder 30 in which the resistor 10 and diode 20 are installed and the second holder 40 in which both terminals 50 and 60 are installed, before they are coupled with each other. The first and second holders 30 and 40 can be facilely coupled with each other by a fixing protrusion 45 formed on an upper surface of the second holder 40 and a fixing hole 32 formed in a lower surface of the first holder 30. The fixing protrusion 45 and fixing hole 32 may have various shapes. In FIG. 5a, the fixing protrusion 45 is formed on the second holder 40. However, the fixing protrusion 45 may be formed at the first holder 30 and thus the fixing hole 32 may be formed at the second holder 40. These coupling structures of the first and second holders 30 and 40 may be changed variously within an intention of the present invention. FIG. 5b is a perspective view of the assembled middle assembly 70 of the sleeve connector for the electromagnetic clutch according to the preferred embodiment of the present invention. The resistor 10, the diode 20 and the two terminals 50 and 60 can be maintained at their original positions by the middle assembly 70. By plastic-molding the middle assembly 70, the sleeve connector for the electromagnetic clutch according to the preferred embodiment of the present invention can be completed.

FIG. 6 is a perspective view of the sleeve connector 100 for the electromagnetic clutch according to the preferred embodiment of the present invention. The portion shown by a dotted line in FIG. 6 designates the housing 80. As shown in FIG. 6, holders 30 and 40 maintain the resistor 10 and diode 20 at their positions during the assembling process. The holders 30 and 40 function to reduce the possibility of the shorts between the both terminals 50 and 60 due to the contact between the terminals 50 and 60 as well as prevent the deviation of the resistor 10 and diode 20 from their positions.

A discharge device of the sleeve connector of the present invention has various types as follows.

A varistor type is a very widely used discharge circuit, in which the capacitance of a capacitor is varied so as to change a value of capacitance and have about 100V of counter electromotive force, and thus which has good absorption efficiency and also has a rapid OFF time.

A resistor type uses a characteristic that, if a resistance value is reduced, the counter electromotive force is also reduced and the OFF time is increased. It is preferable that the resistance value is about 10 times larger than an internal resistance value of a coil.

A diode type can completely absorb the counter electromotive force, and has the OFF time that is 3 or 4 times longer than the varistor type. However, it should be careful of torque interference when using a clutch.

A zener diode type has an OFF time faster than the diode type. In this type, the counter electromotive force is determined by a zener diode voltage, and this type is mainly used in a clutch having a small capacity.

A CR (Capacitor-Resistor) type can have a fast OFF time by properly selecting a condenser and a resistance value, and also mainly used in a clutch having a small capacity.

INDUSTRIAL APPLICABILITY

As described above, a sleeve connector for an electromagnetic clutch of the preferred embodiment of the present invention does not use an epoxy molding process that increases fabricating cost. Since the sleeve connector uses a holder for fixing each parts, each of the parts is maintained in position during the plastic molding process.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. A sleeve connector for an electromagnetic clutch, comprising:
    a discharge device for absorbing a surge voltage;
    a magnetic field elimination device for eliminating residual magnetic field, which is electrically connected with one end of the discharge device;
    a first holder for installing the discharge device and the magnetic field elimination device;
    first and second terminals that are respectively connected with the discharge device and the magnetic field elimination device;
    a second holder for installing the two terminals in a status that the two terminals are insulated from each other,
    wherein the holders are joined to form a middle assembly comprising the discharge device, the magnetic field elimination device, the first holder, the first and second terminals and the second holder that are encapsulated by plastic.

2. The sleeve connector for an electromagnetic clutch as set forth in claim 1, wherein a fixing protrusion is formed at one of the first and second holder, and a fixing hole corresponding to the fixing protrusion is formed at the other.

3. The sleeve connector for an electromagnetic clutch as set forth in claim 1, wherein the discharge device is a diode, and the magnetic field elimination device is a resistor.

4. The sleeve connector for an electromagnetic clutch as set forth in claim 3, wherein the first and second terminals respectively comprise a diode connection part and a resistor connection part so that a wire of the resistor is connected to one of the terminals and a wire of the diode is connected to the other.

5. A sleeve connector for an electromagnetic clutch comprising a first holder carrying first and second electrical components for absorbing surge voltage and removing an induced magnetic field generated by an electromagnetic clutch field coil assembly, first and second terminals respectively connected with the first and second components, a second holder holding the first and second terminals so the first and second terminals are insulated from each other, and a molded plastic middle assembly encapsulating the first and second components, the first and second holders and the first and second terminals and joining the holders to each other.

6. The connector of claim 5 wherein one of the holders includes a fixing protrusion, the other of the holders including a fixing hole corresponding to the fixing protrusion.

7. The connector of claim 5 wherein the first and second electrical components are respectively a diode and resistor.

8. The connector of claim 7 wherein the first and second terminals respectively comprise a diode connection part and a resistor connection part so that a wire of the resistor is connected to one of the terminals and a wire of the diode is connected to the other.

* * * * *